US006658194B1

(12) United States Patent
Omori

(10) Patent No.: US 6,658,194 B1
(45) Date of Patent: Dec. 2, 2003

(54) EDITING DEVICE AND EDITING METHOD

(75) Inventor: Shigeru Omori, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/511,538

(22) Filed: Feb. 23, 2000

(30) Foreign Application Priority Data

Feb. 25, 1999 (JP) .......................................... 11-049175

(51) Int. Cl.[7] .................................................. H04N 5/93

(52) U.S. Cl. .......................... 386/52; 386/55; 345/723; 369/47.3

(58) Field of Search ............................... 386/52, 55, 4, 386/21, 54, 68, 100; 345/716, 723; 369/47.3, 85; H04N 5/93

(56) References Cited

U.S. PATENT DOCUMENTS 5,051,845 A * 9/1991 Gardner et al. ............... 386/52
5,367,341 A * 11/1994 Schnorf ...................... 348/616
5,465,120 A * 11/1995 Schultheiss ................. 348/716
5,481,543 A * 1/1996 Veltman ..................... 348/423
5,485,448 A * 1/1996 Kishi et al. ................ 369/47.3
5,568,275 A * 10/1996 Norton et al. ................ 386/52
5,647,047 A * 7/1997 Nagasawa .................... 386/52
6,085,020 A * 7/2000 Saito et al. ................... 386/54

* cited by examiner

*Primary Examiner*—Vincent Boccio
(74) *Attorney, Agent, or Firm*—Frommer Lawrence & Haug LLP; William S. Frommer

(57) ABSTRACT

An editing device and editing method are capable of remarkably shortening editing time. In the case where the edited video and audio obtained as a result of editing have any parts that cannot be transported at a specified output rate, only the untransportable parts are extracted and subjected to the editing processing before the actual transmission so as to cope with the output rate. In this way, an editing device and editing method capable of remarkably shortening the editing time can be realized.

3 Claims, 12 Drawing Sheets

EDITING DEVICE AND EDITING METHOD

BACKGROUND OF THE INVENTION

1. Field of the Invention

This invention relates to an editing device and editing method, and more particularly, is suitably applied to an editing system capable of conducting the editing (hybrid editing) which is a combination of an editing using video and audio signals recorded on the magnetic tape (linear editing) and an editing using video and audio signals recorded on the hard disk (nonlinear editing) are combined.

2. Description of the Related Art

As this type of editing device registers a desired part of video and audio recorded on a video tape as a clip and conducts editing processing according to an editing list of the desired editing contents for the registered clips, in order to download the resultant edited video and edited audio onto the video tape.

Some recent video tape recorders have a video/audio signal format compatible with the digital system such as a serial data transport interface (SDTI), a serial data interface (SDI), and are capable of inputting/outputting video and audio signals according to the signal format.

In the case where such an input signal format of a video tape recorder is in a video signal format compatible with the SDTI digital system (hereinafter referred to as a SDTI format), an editing device can download the resultant edited video and edited audio onto a video tape in the video tape recorder at a data transmission speed four times faster than the real time (hereinafter referred to as high speed).

However, in such an editing device, since a switcher for executing the image special effect processing is previously set so that its hardware construction is suitable for the real time processing, the edited video part (hereinafter referred to as an effect part) to which image special effect processing is applied by the switcher can not be downloaded at higher speed than real time.

This means that since the hardware construction of a mixer is also set to be suitable for the real time processing in the mixing processing of audio materials by the mixer, in addition to the image effect processing by the switcher, an edited audio part (hereinafter, referred to as a mixing part) to which audio mixing processing is applied by the mixer can be downloaded at a higher speed than the real time.

In general, in the editing device, in the case where the edited video and edited audio include the effect part or mixing part, after all edited video and edited audio are recorded once on a hard disk device in real time, these are downloaded onto the video tape at a high speed as described above.

As a result, especially when downloading the same editing result the plural number of times, an operator has to repeat the same editing work many times in order to get the editing result, and it causes a problem that the time required for downloading became longer.

SUMMARY OF THE INVENTION

In view of the foregoing, an object of this invention is to provide an editing device and editing method capable of remarkably shortening the editing time.

The foregoing object and other objects of the invention have been achieved by the provision of an editing device for transporting edited video and audio obtained as a result of editing, at a pre-specified output rate. The editing device comprises an extracting means for extracting parts which are untransportable at the output rate, from among edited video and audio, a memory means for memorizing the untransportable parts extracted by the extracting means, an editing processing means for applying predetermined editing processing to the untransportable parts read out from the memory means, and a high-speed transporting means for transporting the untransportable parts subjected to the editing processing by the editing processing means, at the output rate.

As a result, in this editing device, even in the case where these edited video and audio includes parts which are untransportable at the pre-specified output rate, the edited video and audio can be transported by extracting only the untransportable parts by the extracting parts, storing them in the memory means, and applying the editing processing to them by the editing processing means so as to cope with the output rate before the actual transmission.

Furthermore, the present invention provides an editing method of transporting an edited video and audio obtained as a result of editing at a prespecified output rate. The editing method comprises a first step of extracting parts which are untransportable at an output rate, from the edited video and audio, a second step of applying prescribed editing processing to the extracted untransportable parts, and a third step of transporting these editing-processed untransportable parts at the output rate.

As a result, in this editing method, even in the case where the edited video and audio include the parts which are untransportable at the pre-specified output rate, the edited video and audio can be transported by extracting only the untransportable parts, and applying the editing processing to them so as to cope with the output rate before the actual transmission.

The nature, principle and utility of the invention will become more apparent from the following detailed description when read in conjunction with the accompanying drawings in which like pats are designated by like reference numerals or characters.

DETAILED DESCRIPTION OF THE EMBODIMENT

Figure 1:
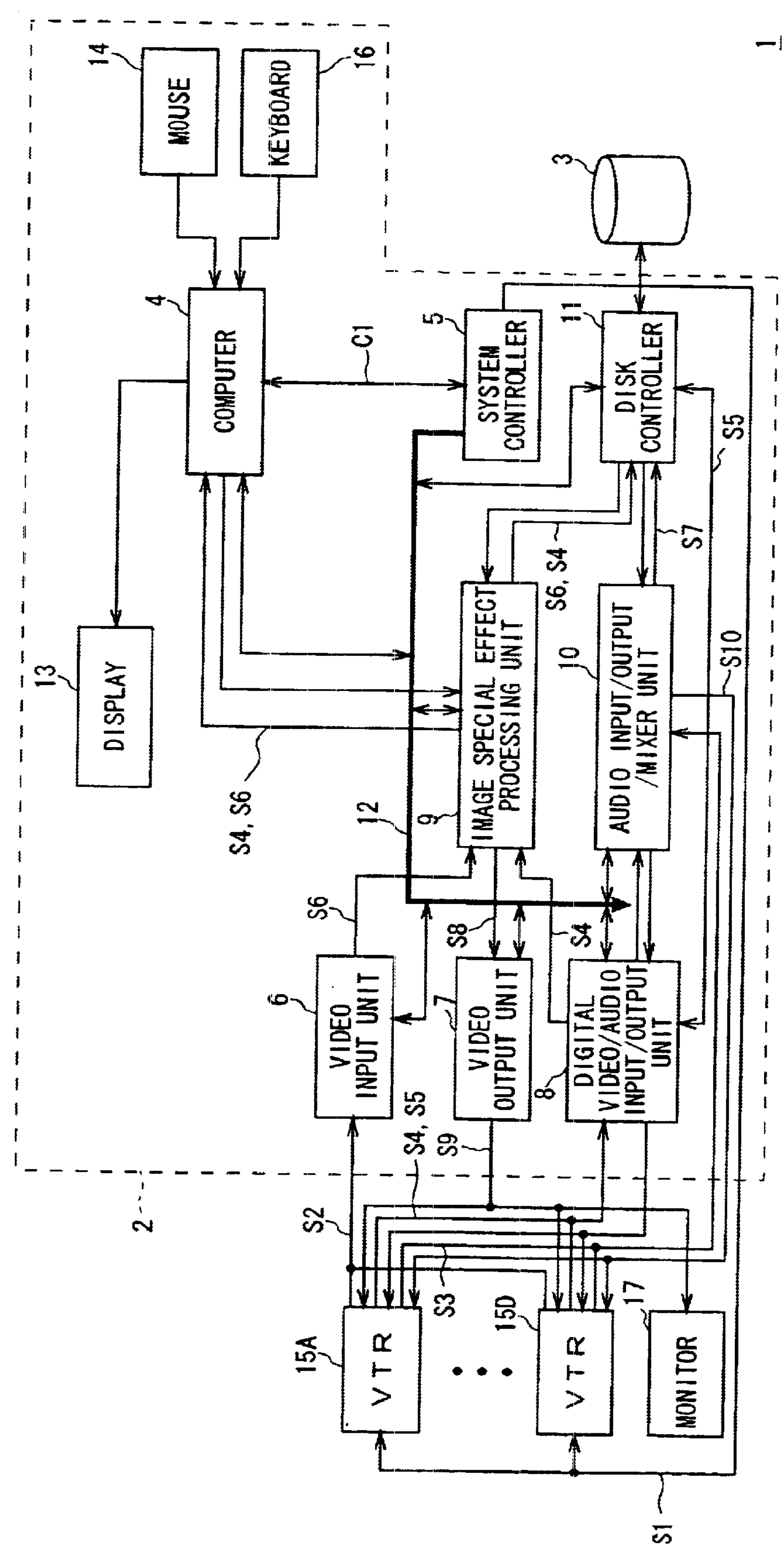
FIG. 1 is a block dialog showing the general construction of an editing system according to the embodiment of the present invention.

Preferred embodiments of this invention will be described with reference to the accompanying drawings:

In FIG. 1, 1 generally shows an editing system according to the present invention. An editing device 2 is capable of registering a desired part of video and audio recorded on a video tape as a clip, and can make the hard disk device 3 take in a video signal and audio signal of a desired clip as required.

In addition, this editing device 2 can make an editing list of editing contents which is capable of obtaining a desired edited video and audio by connecting registered clips in a desired condition. And moreover, the editing device can actually perform the editing processing in accordance with the editing list to record the resultant edited video and edited audio on a video tape.

More specifically, this editing device 2 is composed of a computer 4, a system controller 5, a video input unit 6, a video output unit 7, a digital video/audio input/output unit 8, an image special effect processing unit 9, an audio input/output/mixer unit 10, and a disk controller 11 which are connected each other with a control bus 12.

In this case, when starting up, the computer 4 displays a predetermined operation screen (hereinafter referred to as a main screen) on a display 13. And under this condition, when a clip register mode is selected by manipulating a mouse 14 and a reproduction operation command of one video tape recorder 15A–15D from among plural video tape recorders 15A to 15D connected to the editing device 2 is entered, the computer 4 outputs a control command C1 corresponding to this, to the system controller 5.

The system controller 5 outputs a control signal S1 to the corresponding video tape recorder 15A–15D to reproduce the video signal and audio signal being recorded on the video tape, based on the supplied control command.

As a result, an analog video signal S2 and an analog audio signal S3, and a digital video signal S4 and a digital audio signal S5 are output from this video tape recorder 15A–15D. And the analog video signal S2 and the analog audio signal S3 are supplied to the video input unit 6 and the audio input/output/mixer unit 10, respectively. The digital video signal S4 and digital audio signal S5 are supplied to the digital video/audio input/output unit 8.

Furthermore, at this point, the system controller 5 controls either the video input unit 6 and the audio input/output/mixer unit 10 or the digital video/audio input/output unit 8 through the control bus 12 to take in either the analog video signal S2 and analog audio signal S3, or the digital video signal S4 and digital audio signal S5, from the video tape recorder 15A–15D.

With the above arrangement, when the analog video signal S2 is taken in via the video input unit 6, it is supplied to the image special effect processing unit 9 as a digital video signal S6 after being converted into a digital signal at the video input unit 6. And when the digital video signal S4 is taken in via the digital video/audio input/output unit 8, it is supplied to the image special effect processing unit 9 as it is.

Under the control of the system controller 5, the image special effect processing unit 9 outputs the digital video signal S6, S4 supplied from the video input unit 6 or the digital video/audio input/output unit 8, to the computer 4. And thus, under the control of computer 4, the display 13 displays an image based on the digital video signal S6, S4 at predetermined position of the main screen.

On the other hand, when the analog audio signal S3 is taken in, it is transmitted as it is to a speaker (not shown in figure) from the audio input/output/mixer unit 10. And when the digital audio signal S5 is taken in, it is converted into an analog signal and transmitted to the speaker.

Thus, in this editing device 2, the desired parts of image and sound can be specified by the operator using the mouse 14 and keyboard 16 based on the image displayed on the display 13 and the sound output from the speaker. And moreover, their related data such as in-point and out-point time codes and material duration can be registered in the computer 4 as clips.

Furthermore, in the case where the taking-in mode is selected in advance, the computer 4 outputs a corresponding control command C1 to the system controller 5.

The system controller 5 outputs the control signal S1 to the corresponding video tape recorder 15A~15D based on the control command C1 to reproduce the video and audio of the specified clip. On the other hand, the system controller 5 controls either the video input unit 6 and audio input/output/mixer unit 10, or the digital video/audio input/output unit 8 through the control bus 12, to take in either the analog video signal S2 and analog audio signal S3, or the digital video signal S4 and the digital audio signal S5 from the video tape recorder 15A–15D.

As a result, when the analog video signal S2 is taken in via the video input unit 6, it is converted into a digital signal through the video input unit 6 and transmitted as a digital video signal S6 to the disk controller 11 via the image special effect processing unit 9, and when the digital video signal S4 is taken in, it is transmitted as it is to the disk controller 11.

Furthermore, at this point, when the analog audio signal S3 is taken in via the audio input/output/mixer unit 10, it is converted into a digital signal through the audio input/output/mixer unit 10 and transmitted to the disk controller 11 as an audio signal S7. And on the other hand, when the digital audio signal S5 is taken in via the digital video/audio input/output unit 8, it is transmitted directly to the disk controller 11.

Then, the disk controller 11 successively takes in the digital video signal S6, S4 which is supplied from the image special effect processing unit 9 or the digital video/audio input/output unit 8, and the digital audio signal S7, S5 which is supplied from the audio input/output/mixer unit 10 or the digital video/audio input/output unit 8, based on a command to be given from the system controller 5 through the control bus 12, and supplies these to the hard disk device 3 to record these at the specified address position of the hard disk.

With this arrangement, in this editing device 2, the video and audio of the specified clip can be reproduced from the video tape and can be taken in the hard disk device 3.

On the other hand, when the clips are registered as described above, the computer 4 displays the list of registered clips on the main screen displayed on the display 13.

Then, the operator can make the editing list of the editing contents, such as which clip and which clip would be connected, on the main screen. Also the operator can confirm the edited video and edited audio based on the editing list, after this editing list is made or in the middle of making this list.

In practice, when a preview mode of edited video/audio based on the editing list is selected after or in the middle of the production of the editing list, the computer 4 transmits the corresponding control command C1 to the system controller 5.

The system controller 5 transmits the control signal S1 to the corresponding video tape recorder 15A–15D as required based on the supplied control command C1 to reproduce the video and audio of the clip which are used for the editing processing. On the other hand, it controls the disk controller 11 through the control bus 12 as required to reproduce the video and audio of the clip which are used for the editing processing, from the hard disk 3.

As a result, the analog video signal S2, the analog audio signal S3, the digital video signal S4 and digital audio signal S5 of the specified clip are transmitted from the video tape recorder 15A–14D, and the analog video signal S2 and the analog audio signal S3 are given to the video input/output unit 6 and audio input/output/mixer unit 10 respectively, and the digital video signal S4 and digital audio signal S5 are given to the digital video/audio input/output unit 8.

At this point, the system controller 5 controls either the video input unit 6 and the audio input/output/mixer unit 10, or the digital video/audio input/output unit 8 through the control bus 12, to take in either the analog video signal S2 and analog audio signal S3, or the digital video signal S4 and the digital audio signal S5, which are transmitted from the video tape recorder 15A–15D.

In this way, when the analog video signal S2 is taken in via the video input unit 6, this is given to the image special effect processing unit 9 after being converted into a digital signal through the video input unit 6. And when the digital video signal S4 is taken in via the digital video/audio input/output unit 8, it is given to the image special effect processing unit 9 as it is.

The image special effect processing unit 9, under the control of the system controller 5, perform special effect processing on the supplied digital video signal S6, S4 of each clip to the specified condition when occasion demands. Moreover, the image special effect processing unit 9 inserts picture data such as a title and graphics, which is supplied from the computer 4 as required, between the digital video signals S6, S4 of clips, or overlaps it onto the digital video signal S7, S5, and transmits the resultant digital edited video signal S8 to the video output unit 7.

The video output unit 7, under the control of the system controller, converts the supplied digital edited video signal into an analog signal, transmits the resultant edited video signal to the monitor.

On the other hand, when the analog audio signal S3 is taken in via the audio input/ output/mixer unit 10 out of the analog audio signal S3 and digital audio signal S5 transmitted from the video tape recorder 15A–15D, it is transmitted to the speaker as an edited audio signal after being subjected to the editing processing such as mixing at the audio input/output/mixer unit 10 when occasion demands. And when the digital audio signal S5 is taken in via the digital video/audio input/output unit 8, it is converted into an analog signal through the audio input/output/mixer unit 10 and after being subjected to the editing processing such as mixing, transmitted to the speaker as the edited audio signal.

As a result, in this editing device 2, edited images based on the edited video signal are be displayed on the monitor 17 and simultaneously, edited sounds based on the edited audio signal are given from the speaker, and thus the operator can confirm edited image and edited sound based on the editing list.

Furthermore, after the editing list is made and when an execution command of this list is given by operating the mouse 14 or keyboard 16, the computer 4 transmits the corresponding control command C1 to the system controller 5.

The system controller 5 transmits the control signal S1 to the corresponding video tape recorder 15A–15D as necessary based on the supplied control command C1, to reproduce video and audio of the clip which are used for the editing processing. On the other hand, the system controller controls the disk controller 11 through the control bus 12 as required, to reproduce video and audio of the clip which are used for the editing processing, from the hard disk device 3.

As a result, the digital video signal S6, S4 of the required clip is supplied into the image special effect processing unit 9 from the video tape recorder 15A–15D via the video input unit 6 or the digital video/audio input-output unit 8 in the same manner as in the case of the preview mode described above. Or digital video signal S7, S5 of the required clip is supplied into the image special effect processing unit 9 from the hard disk device 3 through the disk controller 11.

Furthermore, at this point, the analog audio signal S3 or the digital audio signal S5 of the required clip is supplied to the audio input/output/mixer unit 10 directly from the video tape recorder 15A~15D or via the video/audio input/output unit 8, or digital audio signal S7, S5 of the required clip is supplied to the audio input/output/mixer unit 10 from the hard disk device 3 via the disk controller 11.

Then, under the control of the system controller 11, the image special effect processing unit 9 performs the special effect processing on the supplied digital video signal S6, S4 of each clip as occasion demands in the same manner as in the case of the preview mode, and transmits the resultant digital edited video signal S8 comprised of an edited video signal, to the video output unit 7.

The video output unit 7, under the control of the system controller 5, converts the supplied edited digital video signal S8 to an analog signal and transmits the resultant edited video signal S9 to the corresponding video tape recorder 15A–15D.

Moreover, at this point, under the control of the system controller 5 the audio input/output/mixer unit 10 applies the editing processing, such as mixing to the supplied analog audio signal S2 or digital audio signal S7, S5 of each clip as occasion demands in the same manner as in the case of the preview mode, and transmits the resultant edited audio signal S10 to the corresponding video tape recorder 15A–15D.

The video tape recorder 15A–15D records the edited video signal S9 supplied from the video output unit 7 and the edited audio signal S10 supplied from the audio input/output/mixer unit 10 at the specified position of the video tape, based on the control signal S1 supplied from the system controller 5.

Thus, this editing device 2 can perform the editing processing on video and audio of a specified clip to a specified condition in accordance with a created editing list and record them on a video tape.

(2) Construction of Computer

Figure 2:
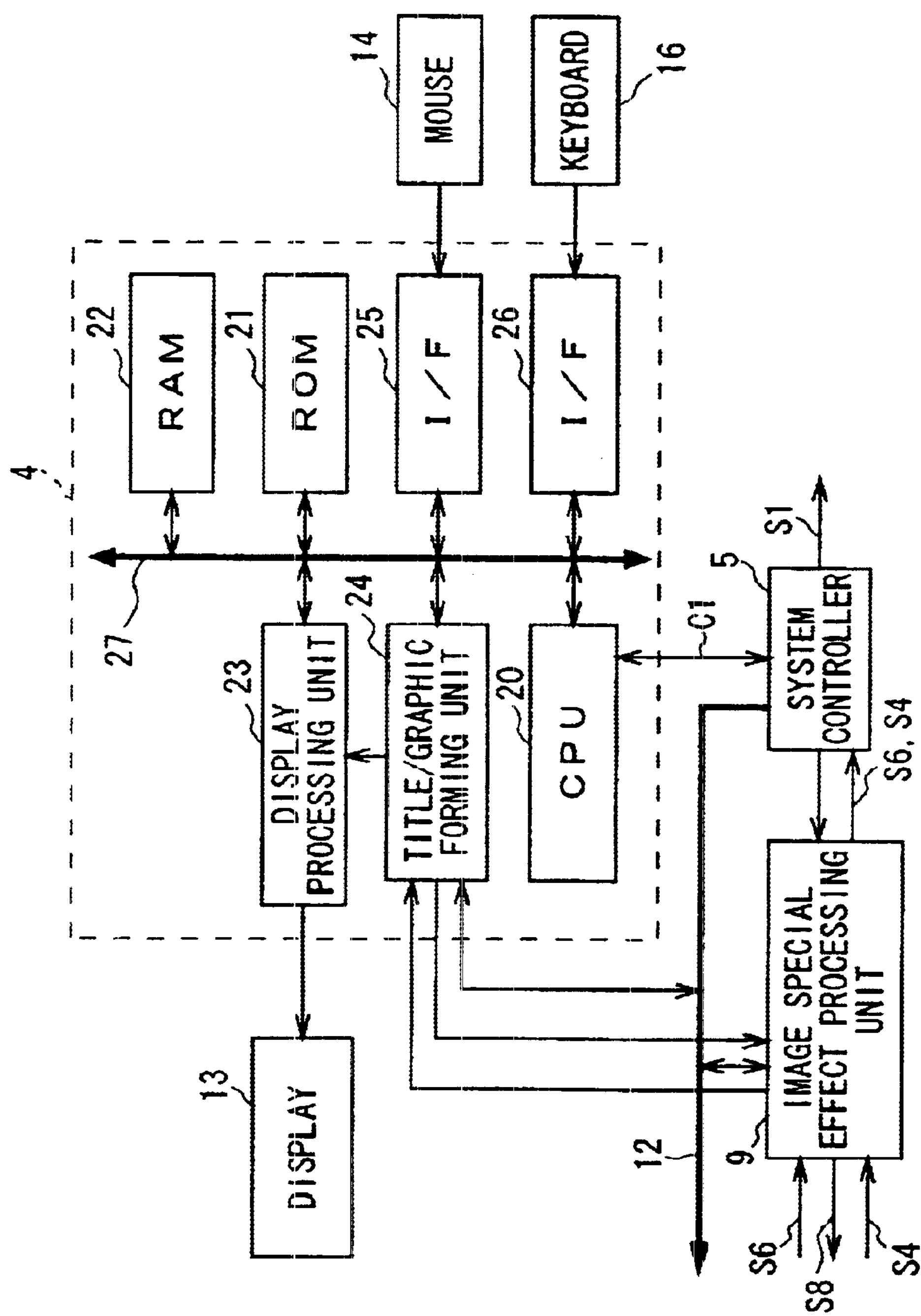
FIG. 2 is a block dialog showing the construction of a computer.

As shown in FIG. 2, the computer 4 is constructed by a central processing unit (CPU) 20, a read only memory (ROM) 21, a random access memory (RAM) 22, a display processing unit 23, a title/graphic forming unit 24, interface circuits 25 and 26 and a small computer system interface (SCS1) interface circuit 28, which are connected with a CPU bus 27 to each other. The computer 4 is connected to a mouse 14 and a keyboard 16 using the interface circuits 25 and 26 and is connected to the hard disk device 3 using the SCS1 interface circuit 28.

In this case, the CPU 20, in accordance with a program stored in the ROM 21, reads out image data in the ROM 21 as occasion demands, and by giving this to the display 13 via the display processing unit 23, displays numbers and characters put in using the cursor moving in the main screen and the keyboard 16 in response to the main screen, various dialogs and mouse operations (to be described later), on the display 13, and also displays motion pictures and still pictures based on the digital video signal S6, S4 to be given to the display processing unit 23 from the image special effect processing unit 9 via the title/graphic forming unit 24, at the predetermined position in the main screen.

Furthermore, when a command to execute the predetermined processing is given via the interface circuits 25 and 26 by manipulating, for example, the mouse 14 and the keyboard 16, the CPU 20 outputs the control command C1 to the system controller 5 as required based on the program stored in the ROM 21, the system controller 5 makes the corresponding video tape recorder 15A–15D, the video input unit 6, the video output unit 7, the digital video audio input/output unit 8, the image special effect processing unit 9, the audio input/output/mixer unit 10 and/or the disk controller 11 perform the predetermined operations. In this way, the editing system 1 can perform various kinds of processing described above, as a whole.

Furthermore, the CPU 20 forms image data of the title characters and graphics by controlling the title/graphic forming unit 24 based on the program stored in the ROM 21 as required, and transmits these to the image special effect processing unit 9 so that the edited video reflects these title characters and graphics.

(3) Operating Procedure on the Main Screen

Figure 3:
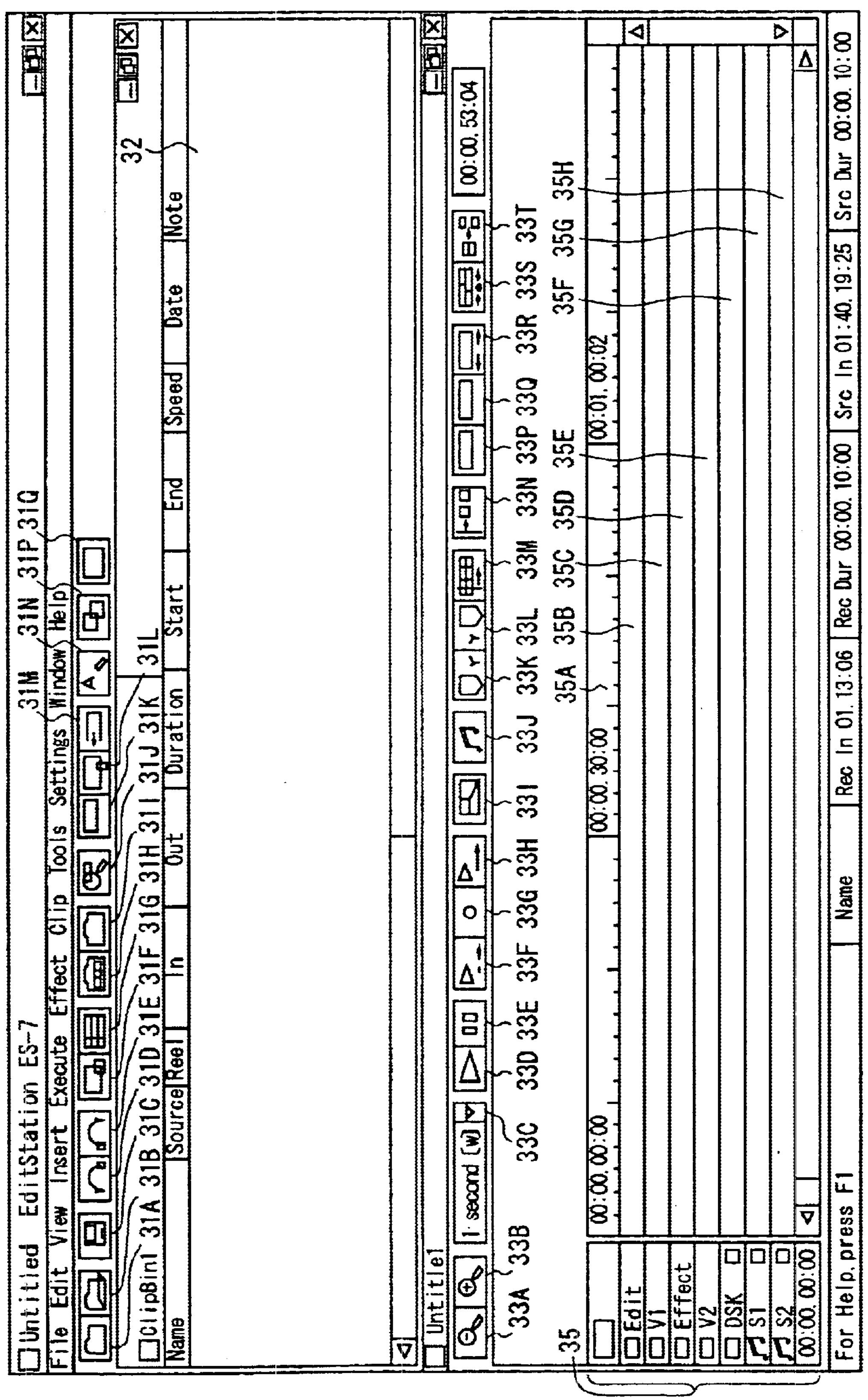
FIG. 3 is a schematic dialog showing a main screen.

In practice, the CPU 20, when starting up at the time when the power source is turned on, displays a main screen 30 shown in FIG. 3 on the display 13 based on the program stored in the ROM 21.

This main screen 30 is provided with menu columns and plural buttons 31A–31Q for selecting desired processing by an operator, a clip information display column 32 for displaying the list of registered clips, plural buttons 33A–33T for specifying various processing at the time of making the editing list, and an editing list making unit 35 for making the editing list.

Figure 4:
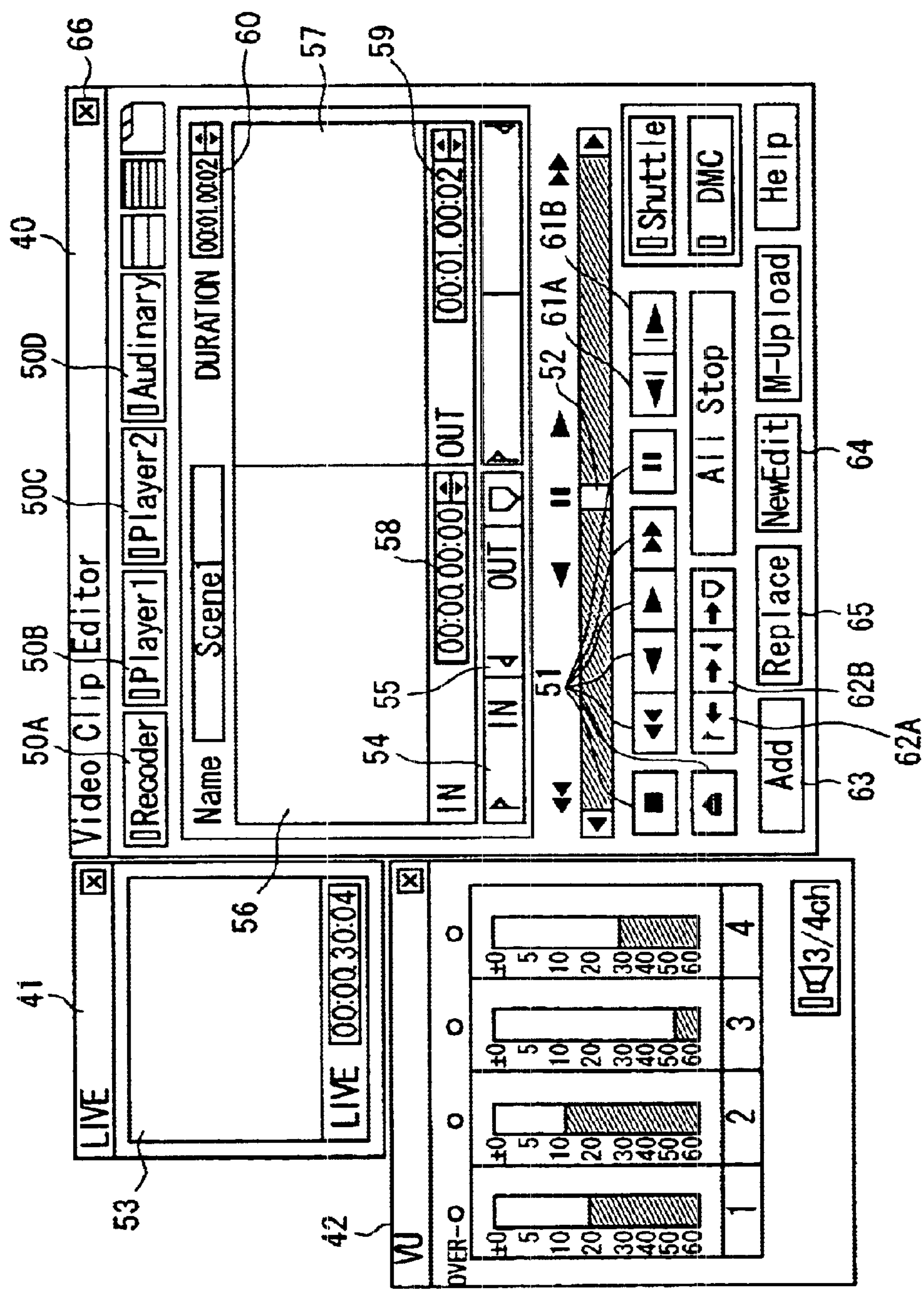
FIG. 4 is a schematic dialog showing a video clip edit dialog.

And on this main screen 30, by clicking a video clip edit button 31K placed in the upper screen, a video clip edit dialog 40, a live image display dialog 41 and an audio level display dialog 42 can be displayed overlapped on the main screen 30, as shown in FIG. 4.

In this case, in the video clip edit dialog 40, the plural source selecting buttons 50A–50D are displayed on the upper—left side corresponding to respective tape recorders 15A–15D, and by clicking one of these source selecting buttons 50A–50D with the mouse, the desired one of the video tape recorders 15A–15D can be selected.

Then, after selecting one source selecting button 50A–50D and by clicking one of video operation buttons 51 displayed in the video clip edit dialog 40, the operator can make the corresponding video tape recorder 15A~15D perform the operation corresponding to the selected video operation button 51. In this connection, by dragging a slider 52 in the video clip edit dialog 40, the operator can also make the corresponding video tape recorder 15A–15D perform the reproduction operation.

And at this event, when the operator makes the video tape recorder 15A–15D execute the reproduction operation or the varying speed reproduction operation, images reproduced from the video tape by the video tape recorder 15A–15D are displayed in the live image display column 53 of this live image display dialog 41, and the audio level of each audio channel is displayed using a meter in the audio level display dialog 42.

Then, the operator, by clicking an in-point specifying button 54 or an out-point specifying button 55 while visually confirming the image displayed in the live image display column 53, can specify an in-point and an out-point of the image part to be registered as a clip. And at this point, the images of the in-point and out-point specified are displayed respectively in the in-point image display column 56 and the out-point image display column 57 of the video clip edit dialog 40.

In addition, at this point, time codes on the video tape of the images specified as the in-point and the out-point are respectively displayed on the in-point time code display column 58 and the out-point time code display column 59 of the video clip edit dialog 40 and the duration of the specified clip is displayed on a duration display column 60.

In this connection, in the video clip edit dialog 40, by clicking a frame forward button 61A, 61B, the image displayed in the live image display dialog 41 can be forwarded frame by frame in the forward direction or the backward direction. Moreover, by clicking a live image transfer button 62A, 62B, the operator can transfer the image displayed in the live image display dialog 41 to the in-point or the out-point.

And the operator, by clicking a register button 63 after specifying the in-point and the out-point of the clip as described above, can register the part from the in-point to the out-point of that video as a clip.

Figure 5:
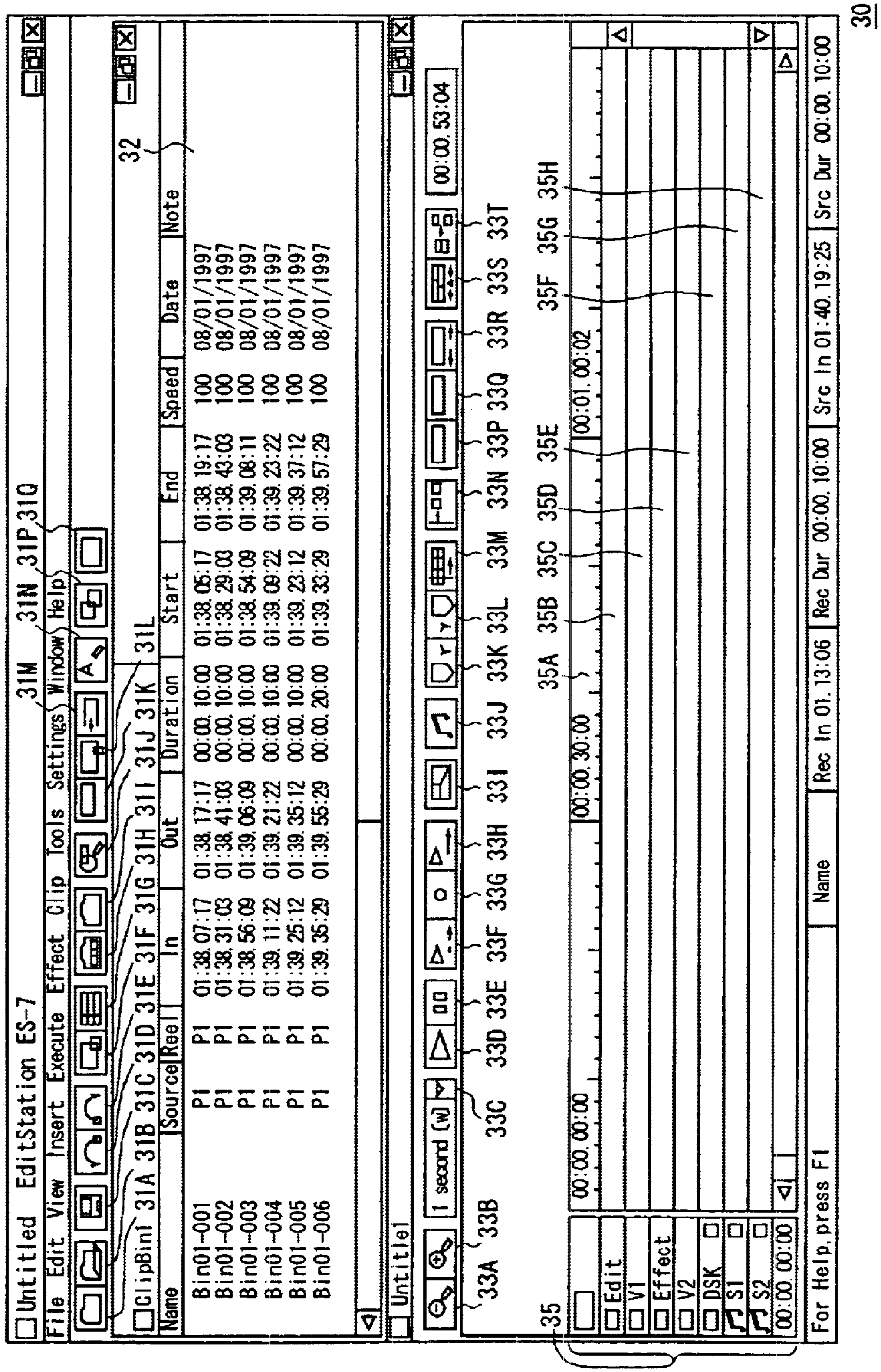
FIGS. 5 to 7 are schematic dialogs showing the main screen.

At this point, time codes of the in-point and the out-point of the clip displayed on the display 13 and the related data, such as duration and storage position (on the video tape or in the hard disk device 3) are stored in the RAM 22 in the computer 4 (FIG. 2) as a database. Moreover, the time codes of the in-point and the out-point and the related data such as duration with respect to the registered clips are displayed in the clip information display column 32 of the main screen 30 as shown in FIG. 5.

Furthermore, at this time, if the taking-in mode is selected in advance on the setting screen (not shown in figure), video and audio of this clip are taken into the hard disk device 3 as described above and the data showing that the storage position of that clip (e.g., flag) is in the hard disk device 3 is stored on the corresponding position in the database.

In this connection, in this editing device 2, the video signal and audio signal of this clip will be entered into the hard disk device 3 for a time equivalent to a predetermined time (e.g., 2 sec.) longer before and after the specified range (i.e., from the specified in-point to out-point). Moreover, at this point, if the link mode is selected in advance on the setting screen, video and audio are linked as data and taken into the hard disk device 3. On the other hand, in the case where the non-link mode is selected, video and audio are taken into the hard disk device 3 without being linked as data.

And in the video clip edit dialog 40, by clicking a new edit button 64, the operator can return it to the initial condition, and thus, the operator can successively register other clips afterwards using the same procedure as described above.

Furthermore, in the video clip edit dialog 40, by selecting a desired clip after clicking a replace button 65, the operator can renew the setting of in-point and out-point of the clip. And moreover, by clicking a close button 65 displayed on the upper right side, the operator can close this video clip edit dialog 40.

On the other hand, in a state (FIG. 5) in which a list of the clips registered in the clip information display column 32 of the main screen 30 as described above is displayed (hereinafter a series of video/audio material groups in this list is referred to as project), the operator can make the editing list in utilizing the editing list making unit 35 of this main screen by the following method.

Figure 6:
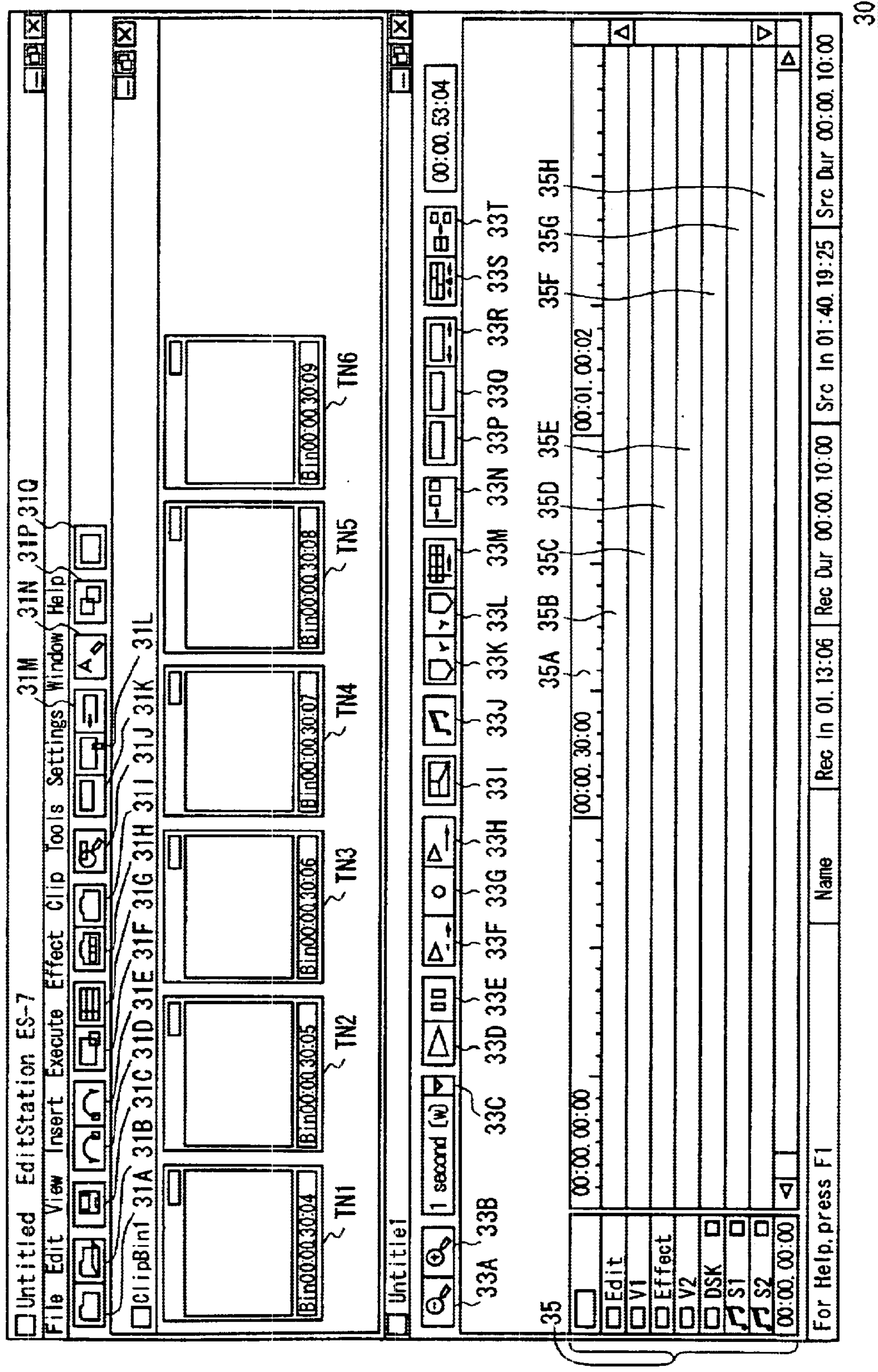

In the clip information display column 32 of the main screen 30 shown in FIG. 5, the list of registered clips is displayed in a text style. And by converting the clip information display 32 into a picture style shown in FIG. 6 according to the operator's selection, the registered clips can be displayed as thumb-nail pictures TN1–TN6.

In this case, firstly, the operator puts the cursor on the desired clip line in the clip information display column 32, and then presses down the button of the mouse 14 (FIG. 1) to specify one clip, and under such conditions, moves the cursor to the desired position in the first or the second video track 35C, 35E using the time scale 35A of the editing list making unit 35 as an indicator, and releases the mouse 14 button.

Figure 7:
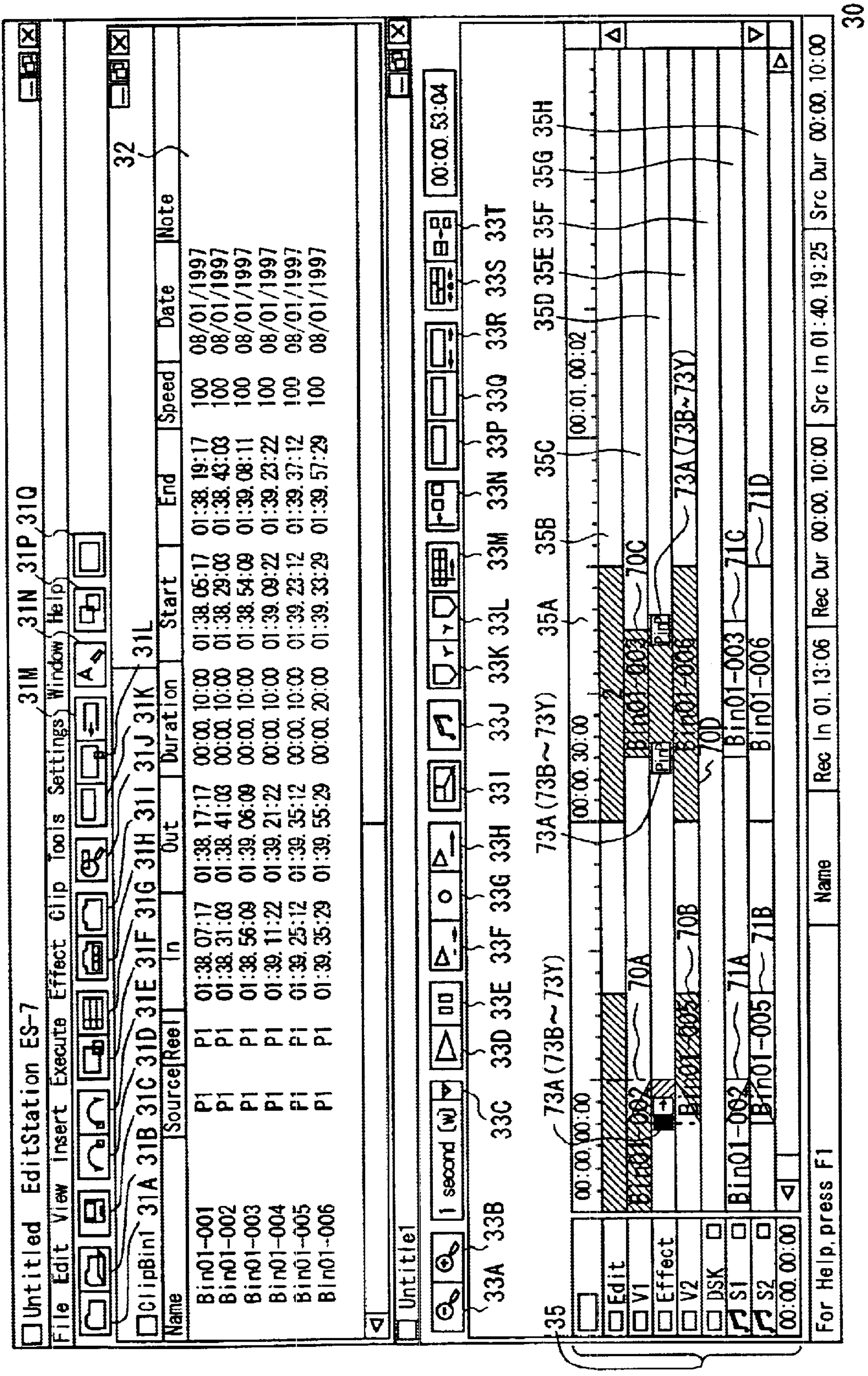

As a result, as shown in FIG. 7, frames 70A–70D having the lengths corresponding to the duration of the specified clip are displayed with the cursor position of this time as the beginning in the first and the second video tracks 35C, 35E. Moreover, at this time, if the image and audio of the clip are linked and registered, frames 71A–71D having the same lengths are displayed on the same positions as the frames displayed in the first and the second video tracks 35C, 35E on the time scale 35A, in the first or the second audio tracks 35G and 35H corresponding to the first or the second video tracks 35C and 35E on which the frames 70A–70D are displayed.

Then, the operator repeats the operation described above and displays the frames 70A–70D, 71A–71D successively on the first and the second video tracks 35C, 35E, and the first and the second audio tracks 35G, 35H so that these continue on the time scale from the first time code ("00:00.00:00") of the time scale 35A to the desired time code (i.e., the desired duration).

Here, the fact that frames 70A–70D, 71A–71D are displayed on the first and the second video tracks 35C, 35E, and the first and the second audio tracks 35G, 35H on the editing list display column 35 means that images and sounds of the clip corresponding to the frames 70A–70C, 71A–71D are displayed or given during the time shown by the time scale 35A in the output of edited video and audio. Thus, with such operations, the editing list can be made, which successively specifies an image and audio of a clip to be displayed and given as edited images and edited sounds.

In the case of making the editing list as described above, if the operator desires to apply the image special effect processing when the video is being shifted from the first clip image to the second clip image, the operator displays the first frame 70A corresponding to the preceding first clip on ether the first or the second video track 35C, 35E, and displays the second frame 70B corresponding to the succeeding second clip on the other second or the first video track 35E, 35C so that the time codes of the rear part of the first frame 70A and its front part overlap on the time scale 35A.

Figure 8:
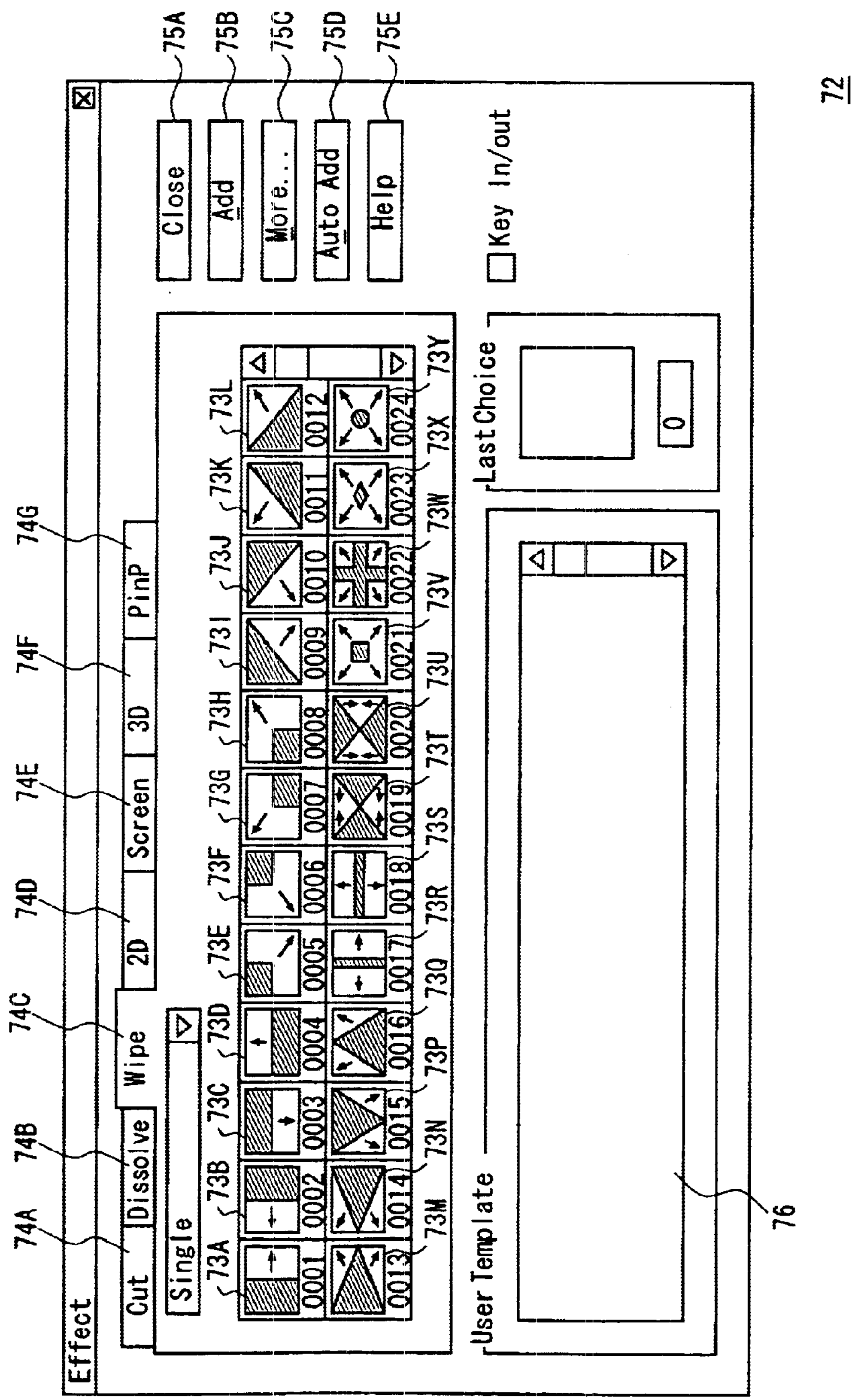
FIG. 8 is a schematic dialog showing a select effect dialog.

Next, a select effect button 33R in the middle screen is clicked. As a result, a predetermined dialog (hereinafter referred to as a select effect dialog) 72 as shown in FIG. 8 on which plural ICONs showing the various kinds of image special effect processing that can be executed (hereinafter referred to as effect ICON) 73A–73Y are displayed can be displayed.

Then, the operator moves the cursor on a desired effect ICON 73A–73Y of the image special effect processing, presses the button of the mouse 14 (FIG. 1). And under such condition, the operator moves the cursor onto the part at which time codes of the first and the second frames 70A, 70B in the effect track 35D of the editing list making unit 35 are overlapped on the time scale 35A and releases (drag and drop) the button of the mouse 14.

As a result, the effect ICON 73A–73Y dragged in the select effect dialog 72 are moved on the screen with the cursor and displayed under the condition pasted on the position dropped.

With this arrangement, at the overlapped part of the image of the clip corresponding to the first frame 70A displayed on the first or the second video track 35C, 35E and the image of the clip corresponding to the second frame 70B displayed on the other second or the first video track 35E, 35C, the operator can put a command to perform the image special effect processing corresponding to the effect ICON 73A–73Y pasted as described above.

Furthermore, after or in the middle of making the editing list, the operator selects a preview mode by clicking a preview button 33D displayed in the middle screen of the main screen 30, in order to display edited images based on the editing list on the monitor 17 (FIG. 1) and to give edited sounds based on the editing list from the speaker as described above.

After making the editing list in this way, the operator selects a download mode by clicking a record button 33G displayed in the middle main screen 30, to execute the editing processing based on the editing list. And thus obtained edited video and edited audio can be recorded on the video tape via the video tape recorder 15A–15D specified in advance.

(4) Download Dialog

Figure 9:
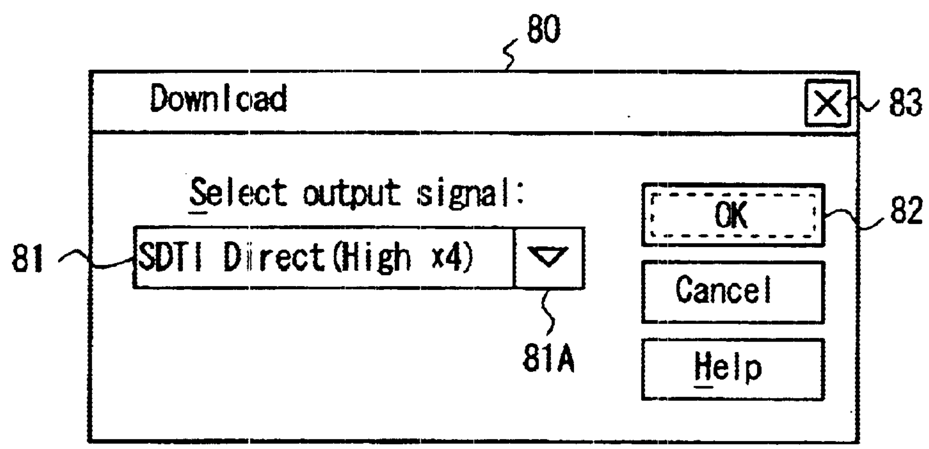
FIG. 9 is a schematic dialog showing a download dialog.

At this point, after displaying the execute dialog (not shown in Figure by selecting "Execute" in the menu column provided at the upper main screen 30, and further selecting "Download to VTR" (i.e., download mode described above) from among these dialogs, the operator can display the download dialog 80 as shown in FIG. 9.

At the preceding stage, after displaying a tool dialog (not shown in Figure by selecting "Tool" of the menu column provided at the upper main screen 30, the operator displays a device setting dialog by selecting "Device". And then, the operator, in utilizing the device setting dialog, can select the desired signal format as the signal format of video/audio signal to be transmitted to the recording video tape recorder 15A–15D from the editing device 2. In this case, SDTI format is selected in advance since the download is conducted at high speed (i.e., the data transmission speed of 4 times of the real time).

In addition, a transmission speed setting column 81 is provided on this download dialog, and by clicking the pull down button 81A displayed on the right side, the data transmission speed (real time or high speed) corresponding to the selected SDTI format is displayed as "SDTI Direct [High×4]" in the transmission speed setting column 81.

Figure 10:
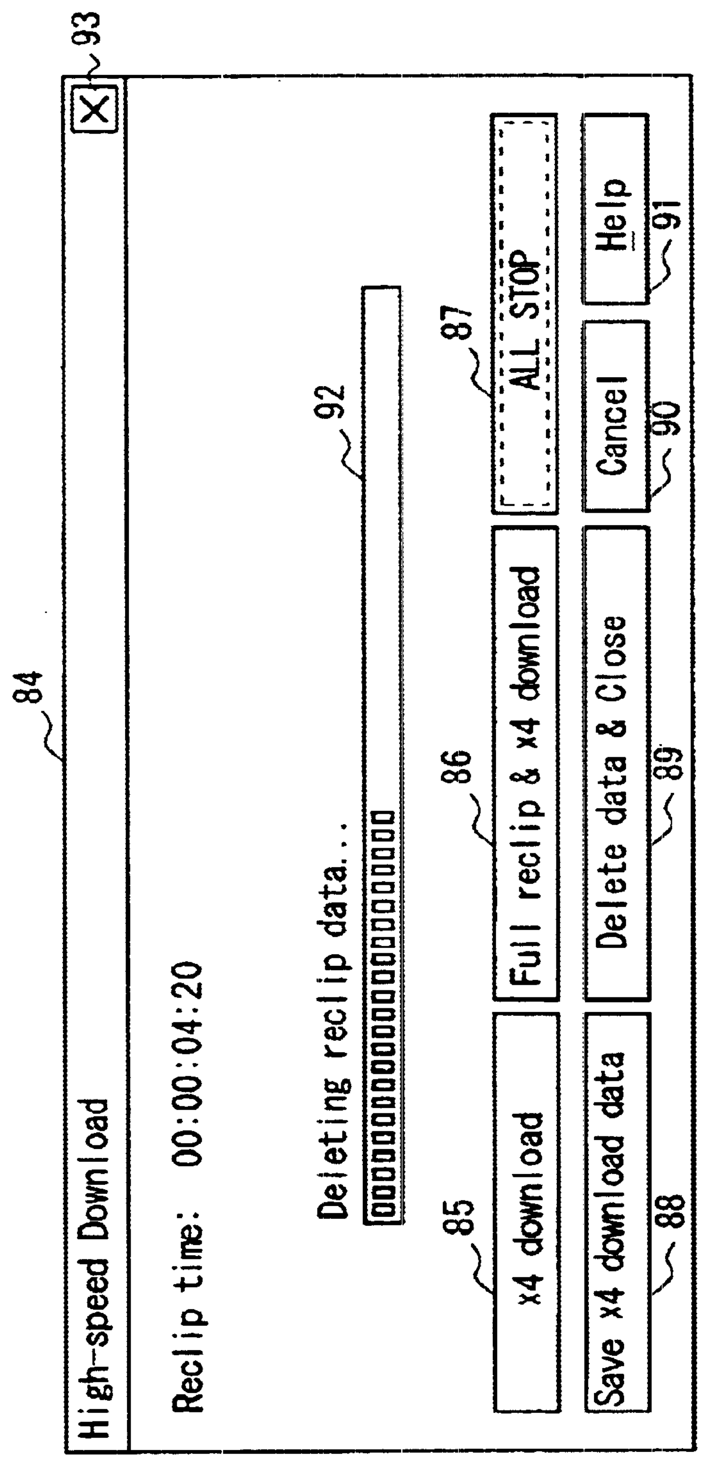
FIG. 10 is a schematic dialog showing a high speed download dialog.

Next, the operator, by clicking the OK button 82 provided at the right side of the transmission speed setting column 81, the selected data transmission speed is set in the computer 4 (i.e., memorized in the RAM 22). As a result, the download dialog 80 is closed and the high speed download dialog 84 as shown in FIG. 10 is overlapped and displayed on the main screen 30.

In this connection, if the operator clicks the close button 83 displayed at the upper right of the transmission speed setting column 81 after selecting the data transmission speed as described above, the operator can close the download dialog 80.

In the case of downloading each clip on the time scale 35A at high speed (the data transmission speed of 4 times of the real time) in utilizing the high speed download dialog 84, the operator, after detecting material parts that cannot be downloaded at the high speed, processes the material parts in real time to gather them as one clip (hereinafter referred to as reclip), and pasts it on the virtual time scale (hereinafter referred to as hidden time scale) (not shown in figure) by connecting cuts.

More specifically, the material parts which are targets of reclip because they cannot be downloaded at high speed (hereinafter referred to as reclip parts), includes effect parts (including the case of either the first or the second video track 35C or 35E), mixing parts (e.g., channel switching, adjustment of the right and left audio level, filter facility corresponding to the audio level), the clip part on which audio rubber band is set (hereinafter referred to as the rubber band part), title clip parts (also applicable to the first and the second video tracks 35C and 35E in addition to the exclusive track 35F), color clip parts (e.g., a screen obtained from the switcher), audio cross fade parts, a part at which frames are overlapped in the first and the second video tracks 35C, 35E (hereinafter referred to as a dissolve part), and a part at which frames are overlapped in the first and the second audio tracks 35G, 35H (hereinafter referred to as an audio frame dissolve part).

Since the hardware constructions of switchers and mixers are all set on the basis of real time, these clip parts, effect parts, mixing parts, rubber band parts, title clip parts, color clip parts, audio cross fade parts, dissolve parts and audio frame dissolve parts cannot be processed at higher speed than the real time.

In this connection, the actual reclip part is the one obtained by adding the material part that cannot be processed at high speed (such as effect part) and the preceding five frames obtained by considering the processing time of the material part (such as switching time by the switcher).

As shown in FIG. 10, in the high speed download dialog 84, the time required for processing all clip parts regarding the project in real time (i.e., the total time) is displayed at the upper screen. And at the lower screen, an execute display column to execute the high speed download ("×4 download") 85, an after-processing execute display column to execute the high speed download after all reclip ("Full reclip &×4 download") 86, an all stop display column to stop all operations ("ALL STOP") 87, a save display column to save contents of the high speed download ("Save×4 download data") 88, a delete display column to delete and close data ("Delete data & close") 89, a cancel display column ("Cancel") 90, and a help display column ("Help") 91 are displayed.

When this high speed download dialog 84 is overlapped and displayed on the main screen 30, firstly, the total time of all reclip parts is display and simultaneously, "Clearing reclip data" is displayed at the upper left of the progress bar 92 displayed in the middle screen. And out of IDs (Identification) allocated to the hard disk of the hard disk device 3 (FIG. 1), the ID used in the previous reclip part is deleted. At this point, in the progress bar 92 provided in the middle screen, the progress in deleting ID used in the previous reclip part is displayed as the change of the data amount and simultaneously, all display columns 85–91 at the lower screen become ineffective except the ALL STOP display column 87. And in order to close the high speed download dialog 84, just click the close button 93 displayed on the upper right part.

Then, the high speed download dialog 84 is in the download standby condition during the predetermined period of time. And at this time, the progress bar 92 is in the no-display condition and the execute display column 85, the after processing execute display column 86, the cancel display column 90 and the help display column 91 are in the operative condition.

Figure 11:
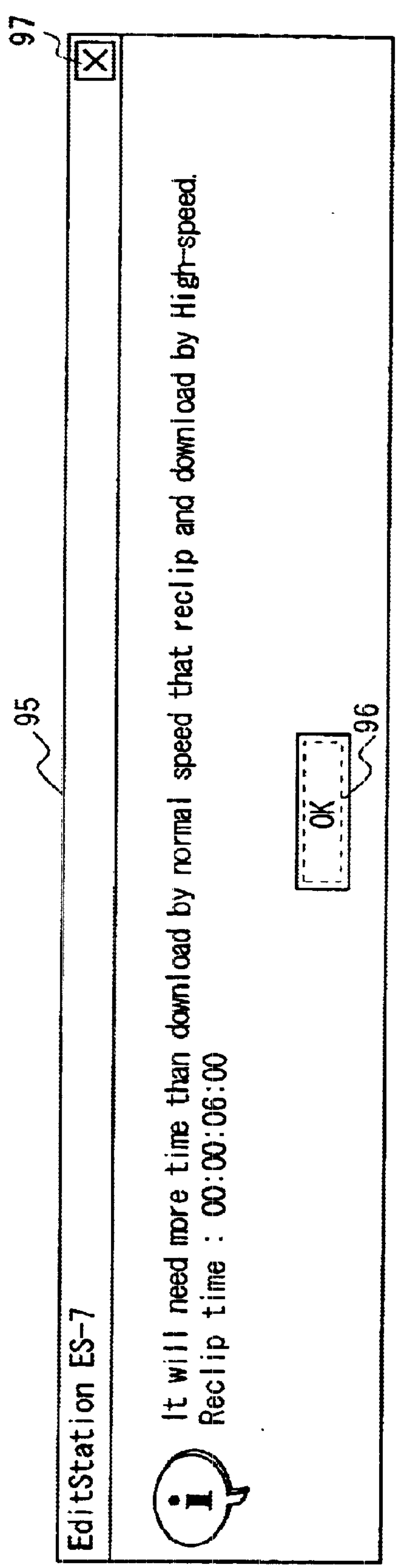
FIG. 11 is a schematic dialog showing a time notification dialog.

During the download standby condition, the high speed download dialog 84 detects whether the total time of all reclip parts is longer than three quarter of the total time on the time scale 35A in real time or not. And if the total time of all reclip parts is longer than three quarter of the total time, it displays what it takes longer time for the download to download at high speed than to download in real time, on the time notice dialog 95 as shown in FIG. 11. And by clicking the OK button 96 provided in the center of the time notice dialog 95 or the close button 97 provided at the upper right of the screen, the operator can close this time notice dialog 95.

Then, when the operator clicks the execute display column 85 displayed in the high speed download dialog 84 with the mouse, "Reclip" described above is executed. At this point, a time line cursor (not shown in figure) moves in the rightward in synchronism with the operation of reclip so as to trace the material part presently being reclipped, on the time scale 35A displayed on the main screen 30.

Furthermore, the transition of the reclip operation is displayed on the progress bar 92 displayed in the middle screen of the high speed download dialog 84, and simultaneously "Reclip" is displayed at the upper left of the progress bar 92. Moreover, the display columns 85–91 provided at the lower screen are in the inoperative conditions except the full stop display column 87.

In practice, in the editing device 2, the CPU 20 of the computer 4 (FIG. 2) sequentially detects material parts that cannot be downloaded at high speed with respect to the project displayed on the main screen 30, and after processing each material part in real time, affixes it on the virtual hidden time scale (not shown in figure) together with the other clips in time series by connecting cuts. And thus obtained clip part is allocated with new ID and recorded on the hard disk in the hard disk device 3.

Thus, when the CPU 20 records all reclip parts in one project displayed on the main screen 30, in the hard disk in the hard disk device 3, "×4 Download" is displayed at the upper left of the progress bar 92 provided in the middle screen of the high speed download dialog 84 and the high speed download is executed.

At this point, on the time scale 35A displayed on the main screen 30, the time line cursor moves in the rightward in synchronism with the download processing to trace the clip currently being downloaded at high speed. Moreover, on the progress bar 92 displayed in the middle screen of the high speed download dialog 84, the transition of the download processing is displayed. Moreover, the display columns 85–95 provided at the lower screen is in the inoperative conditions except the full stop display column 87.

Figure 12:
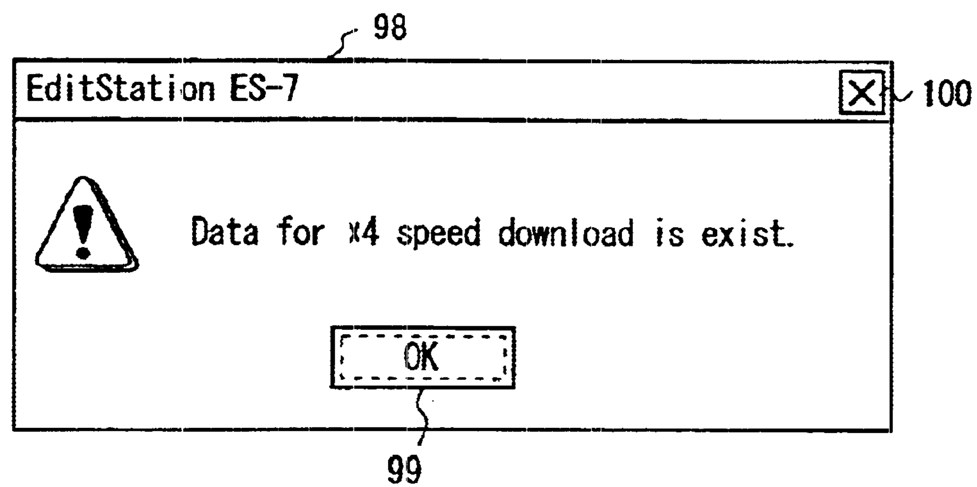
FIG. 12 is a schematic dialog showing an exist dialog.

At this point, in the editing device 2, the CPU 20 in the computer 4 detects whether any of IDs allocated to the hard disk in the hard disk device 3 is identical to the ID used at the previous high speed download or not. And if there is any applicable ID, it displays an exist dialog 98 as shown in FIG. 12 showing that the file previously downloaded at high speed exists. And by clicking the OK button 99 provided in the center screen of this exist dialog 98, or the close button 100 provided at the upper right of the screen, this exist dialog 98 can be closed.

(5) High Speed Download Processing Procedure

Figure 13:
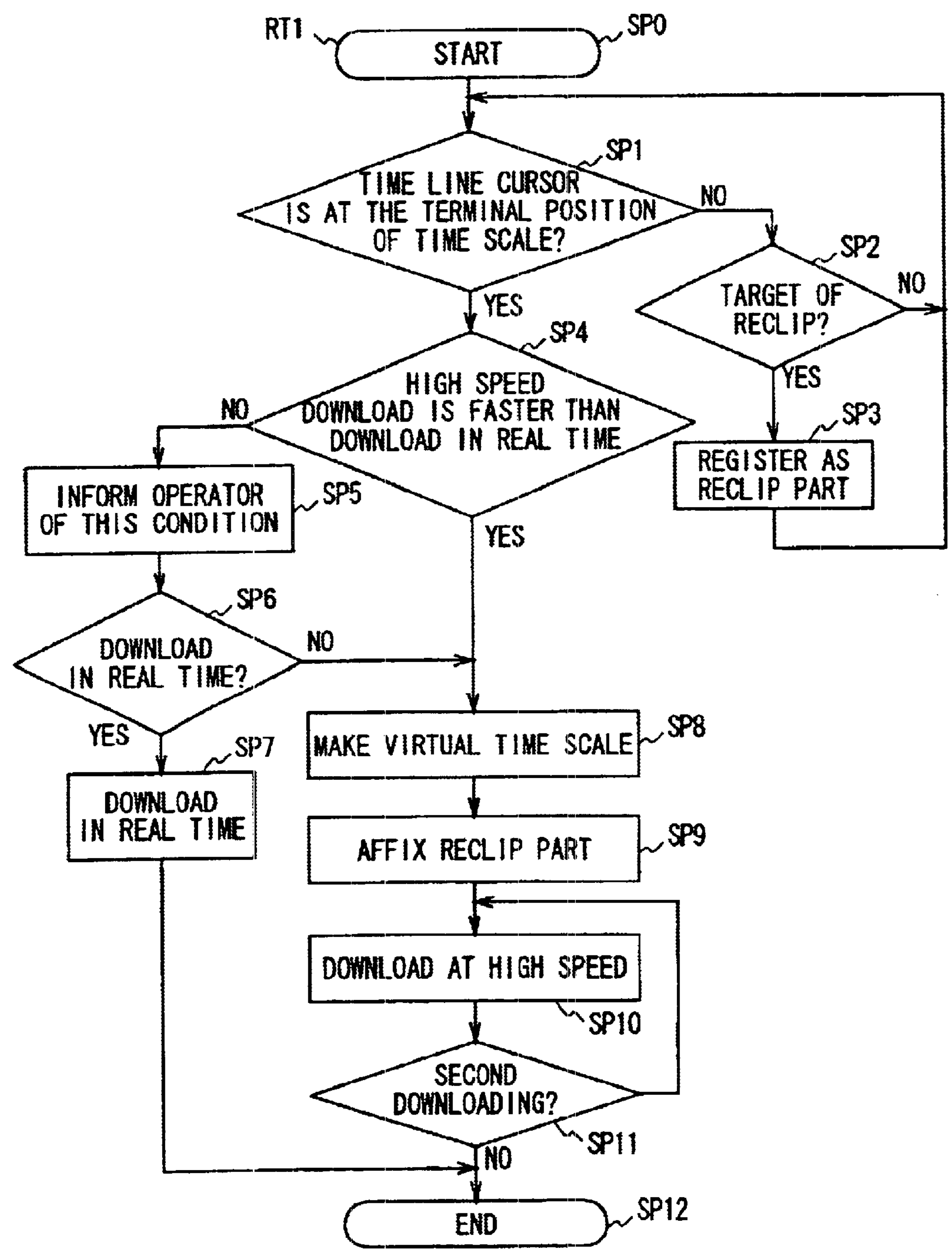
FIG. 13 is a flow-chart illustrating a high speed download processing procedure.

In practice, the CPU 20 executes the high speed download while constructing the reclip parts per project, in accordance with the high speed download processing procedure RT1 shown in FIG. 13.

More precisely, when the high speed download dialog 84 is clicked with an ICON in the menu column displayed on the main screen 30, the CPU 20 starts the high speed download processing procedure RT1 shown in FIG. 13 at step SP0. And at following step SP1, the CPU 20 judges whether the time line cursor is at the terminal position of the time scale 35A (i.e., the position at which no reclip exists in the rear) or not.

And when a negative result is obtained at step SP1, this means that the material part that cannot be downloaded at high speed has not been detected out of projects displayed on the main screen 30. And at this moment, the CPU 20 proceeds to step SP2 and moves the time line cursor in the rightward on the time scale 35A.

Then next, at step SP2, the CPU 20 judges whether or not a clip is the material part that cannot be downloaded at high speed (i.e., reclip part) while the time line cursor moving on the time scale 35A successively passes through the clips. And when an affirmative result is obtained at this step SP2, the CPU 20, after registering the material part as the reclip part, returns to step SP1. On the other hand, when a negative result is obtained at step SP2, the CPU 20 also returns to step SP1.

On the other hand, when an affirmative result is obtained at step SP1, this means that all reclip parts on the project displayed on the main screen 30 are detected. And in this case, the CPU 20 proceeds to step SP3 and judges whether the project download at high speed is faster than the download in real time or not.

If a negative result is obtained at step SP4, the CPU 20 proceeds to step SP5, and overlaps and displays the time notice dialog 95 (FIG. 11) on the main screen 30, and after informing the operator of this, proceeds to step SP6.

At this step SP6, after judging whether to conduct the download in real time according to the operator's instruction or not, when an affirmative result is obtained, the CPU 20 proceeds to step SP7 and executes the download in real time. Then, the CPU 20 proceeds to step SP12 and terminates the high speed download processing procedure RT1. On the other hand, when a negative result is obtained at step SP6, the CPU 20 proceeds to step SP8.

On the other hand, when an affirmative result is obtained at step SP4, this shows that the high speed download can be conducted faster and in a shorter period of time than the real time download. And in this case, the CPU 20 proceeds to step SP8, and after making the virtual hidden time schedule as described above, the CPU 20 affixes all reclip parts in the project displayed on the main screen 30, onto the hidden time schedule at step SP9.

Then, the CPU 20 proceeds to step SP10 and after executing the high speed download to the project displayed on the main screen 30, proceeds to step SP11.

At this step SP11, after judging whether to conduct the second high speed download or not according to the operator's instruction, the CPU 20 returns again to step SP10 only when an affirmative result is obtained and repeats the same processing as described above.

On the other hand, when a negative result is obtained at step SP11, the CPU 20 proceeds to step SP12 and terminates the high speed download processing procedure RT1.

(6) Operation and Effects of the Embodiment

According to the foregoing construction, in the case of downloading a project displayed on the main screen 30 at high speed, after detecting all material parts that cannot be downloaded at high speed in advance, the material parts are aligned on the virtual hidden time scale as a reclip part in time series with the other clips. And the resultant data including reclip parts is recorded on the hard disk in the hard disk device 3.

Accordingly, since the data including clip parts read out from the hard disk in the hard disk device 3 are aligned on a time scale in time series, the high speed download can be executed per project even in the case where the project includes material parts that cannot be downloaded at high speed.

In this connection, in the case where the high speed download takes longer than the download in real time before executing the high speed download, this matter is displayed on the main screen 30 to inform the operator. And thus, the operator can optionally select the one that can be executed in a shorter period of time and thereby, which prevents the waste of time caused by selection mistake.

Furthermore, in the case of copying a video tape of which video/audio contents of the prescribed project are downloaded by the aforementioned high speed downloading, the video tape can be copied in a shorter period of time by downloading the data having the same contents at high speed, as compared with case of using the downloaded video tape as a master tape for dubbing. And such shortening of dubbing time becomes more pronounced as the number of duplicate video tapes increases.

According to the foregoing construction, in this editing system 1, regarding the project displayed on the main screen 30, since the material parts that cannot be downloaded at high speed are aligned on one hidden time schedule as reclip parts with other reclips and the resultant is recorded on the hard disk in the hard disk device, and the reclip parts are downloaded on the video tape in the video tape recorder 15A–15D with other reclips by the aforementioned high speed downloading. Thus, downloading at high speed described above can be conducted even in the case where the project on the main screen 30 includes material parts that cannot be downloaded at high speed. And thereby, an editing system 1 capable of remarkably shortening editing time can be realized.

(7) Other Embodiments

Note that, in the embodiment described above, the present invention is applied to the editing system 1 constructed as shown in FIG. 1. However, the present invention is not only limited to this but also, in short, can be widely applied to various other editing devices, provided that the device can transmit edited video and audio as the edition result at a predetermined output rate.

Furthermore, in the embodiment described above, the CPU 20 in the computer 4 is used as an extracting means for extracting material parts that cannot be processed at high speed, the data transmission speed 4 of times of the real time specified in advance in the edited video and audio, as clip parts. However, the present invention is not only limited to this but, if the output rate is faster than the real time but not 4 times, it can do. Moreover, the effect parts, mixing parts, rubber band parts, title clip parts, color clip parts, audio cross fade parts, dissolve and audio frame overlap parts are untransportable parts (i.e., reclip parts) formed of material parts that cannot be processed at high speed. That is, the parts that cause the CPU 20, the image special effect processing unit 9 and the audio input/output/mixer unit take time for processing these based on the hardware construction are the untransportable parts.

Such a reclip part includes a part on which clip exists in the frame of the third audio track (not shown in figure overlapped with the frame in the first or the second audio track 35G, 35H (hereinafter referred to as the second audio overlapping part), and a part on which clip exists in the frame of the fourth audio track overlapped with the frame in the first, the second or the third audio track (hereinafter referred to as the third audio overlapping part).

Furthermore, in the embodiment described above, the hard disk in the hard disk device 3 is used as a memory means to memorize untransportable parts extracted from edited video/audio, under the control of the CPU 20. However, the present invention is not only limited to this, but also various other memory means, such as RAM 22 in the computer 4, can be widely applied.

Furthermore, in the embodiment described above, the image special effect processing unit 9 and audio input/output/mixer unit 10 are used for the untransportable parts (reclip parts) read out from the hard disk 3, as an editing processing means. However, in short, as long as the circuit can form the reclip parts described above, various other editing processing means including the CPU 20 can be widely applied.

Moreover, in the embodiment described above, the high speed download is executed by aligning untransportable parts in time series on the virtual hidden time scale with other clips using the CPU 20 in the computer 4, as a high speed transporting means for transporting untransportable parts at the pre-specified output rate. However, the present invention is not only limited to this but also, provided that editing-processed untransportable parts can be aligned on the predetermined time axis in time series, any high speed transporting means composed of various other constructions can be applied.

Furthermore, in the embodiment described above, the reclip part is treated as a part of edited video/audio as a result of editing. However, the present invention is not only limited to this but also one project can be all reclipped. This can be conducted when ID allocated to the hard disk in the hard disk device 3 is not enough.

According to the present invention as described above, when the edited video and audio obtained as a result of editing includes parts which are untransportable at the predetermined output rate, only the untransportable parts are extracted by the extracting means and memorized in a storage means, and the editing processing is performed using the editing processing means before the actual transmission so as to cope with the output rate, and then these are transmitted at the output rate by the high speed transporting means. In this way, an editing device capable of remarkably shortening editing time can be realized.

Furthermore, according to the present invention, in this editing method, in the case where the edited video/audio obtained as a result of editing has parts that cannot be transported at the pre-specified output rate, only this untransportable parts are extracted, and subjected to the editing processing before the actual transmission so as to cope with the output rate, and transmitted at the output rate. In this way, an editing method capable of remarkably shortening the editing time can be realized.

While there has been described in connection with the preferred embodiments of the invention, it will be obvious to those skilled in the art that various changes and modifications may be aimed, therefore, to cover in the appended claims all such changes and modifications as fall within the true sprit and scope of the invention.

What is claimed is:

1. An editing apparatus for transporting edited video and/or audio signal at a predetermined output rate, comprising:

extracting means for extracting a part which can not be transported at said predetermined output rate;

memory means for memorizing said part extracted by said extracting means;

edit means for editing said part memorized in said memory means; and transporting means for transporting the part edited by said edit means at said predetermined output rate with other parts.

2. The editing apparatus according to claim 1, wherein said transporting means displays, if transporting at said output rate takes longer than transporting at an output rate based on real time, notice showing this condition.

3. An editing method for transporting edited video and/or audio signal at a predetermined output rate, comprising the steps of:

extracting a part which can not be transported at said predetermined rate;

memorizing said extracted part;

editing said memorized part; and transporting said edited part at said predetermined output rate with other parts.

* * * * *